US 9,893,759 B1

(12) United States Patent
Chukka et al.

(10) Patent No.: US 9,893,759 B1
(45) Date of Patent: Feb. 13, 2018

(54) WIRELESS RELAY ANTENNA ISOLATION

(71) Applicant: Sprint Communications Company L.P., Overland Park, KS (US)

(72) Inventors: Chaitanya Chukka, Schaumburg, IL (US); Matthew J. Masters, Greenfield, IN (US)

(73) Assignee: Sprint Communications Company L.P., Overland Park, KS (US)

( * ) Notice: Subject to any disclaimer, the term of this patent is extended or adjusted under 35 U.S.C. 154(b) by 0 days.

(21) Appl. No.: 15/496,394

(22) Filed: Apr. 25, 2017

(51) Int. Cl.
*H04B 3/36* (2006.01)
*H04B 1/00* (2006.01)
*H04B 1/44* (2006.01)

(52) U.S. Cl.
CPC ..................... *H04B 1/44* (2013.01)

(58) Field of Classification Search
CPC .......... H04W 28/0236; H04W 28/048; H04W 52/24; H04W 52/243; H04W 72/04; H04W 72/0453; H04W 72/082; H04W 84/047; H04W 88/04; H04W 88/08; H04W 92/045; H04B 1/0475; H04B 1/7097; H04B 15/00
USPC .......... 455/7, 11.1, 63.1, 67.13, 68, 69, 522; 370/315, 317, 318, 329
See application file for complete search history.

(56) References Cited

U.S. PATENT DOCUMENTS

| | | | |
|---|---|---|---|
| 4,359,743 A | 11/1982 | DeSantis | |
| 7,376,212 B2 | 5/2008 | Dupuis | |
| 7,460,604 B2 | 12/2008 | Dupuis | |
| 7,486,933 B2 | 2/2009 | Lee et al. | |
| 7,577,223 B2 | 8/2009 | Alfano et al. | |
| 8,049,573 B2 | 11/2011 | Alfano et al. | |
| 8,080,865 B2 | 12/2011 | Harvey | |
| 8,295,226 B2 * | 10/2012 | Fujii | H04W 16/14 370/319 |
| 8,804,598 B2 * | 8/2014 | Ma | H04B 7/15542 455/11.1 |
| 9,007,992 B2 * | 4/2015 | Charbit | H04B 7/15557 455/7 |
| 9,154,987 B2 | 10/2015 | Redana et al. | |
| 9,485,008 B2 | 11/2016 | Dimou et al. | |
| 2008/0070510 A1 | 3/2008 | Doppler et al. | |
| 2010/0118922 A1 | 5/2010 | Ahn | |
| 2012/0002597 A1 | 1/2012 | Yang et al. | |
| 2014/0099881 A1 * | 4/2014 | Boudreau | H04B 7/14 455/7 |

(Continued)

FOREIGN PATENT DOCUMENTS

CN 204013863 U 12/2014
CN 204243211 U 4/2015

*Primary Examiner* — Quochien B Vuong

(57) ABSTRACT

A wireless relay mitigates Radio Frequency (RF) interference. A receive antenna receives RF signals over a receive frequency band. An RF receiver processes the received signals to detect and transfer RF interference levels. The processing circuitry transfers control data to a tunable RF isolator that indicates the size of a guard band between the receive frequency band and a transmit frequency band. The guard band size is selected based on the RF interference levels for the receive frequency band at the receive antenna. The tunable RF isolator attenuates RF frequencies in the tunable guard band from corresponding RF transmit signals. A transmit antenna transfers the RF transmit signals over the transmit frequency band.

20 Claims, 7 Drawing Sheets

(56) References Cited

U.S. PATENT DOCUMENTS

2016/0301145 A1 10/2016 Lee et al.
2016/0360530 A1* 12/2016 Leyh .................... H04B 17/318

* cited by examiner

WIRELESS RELAY ANTENNA ISOLATION

TECHNICAL BACKGROUND

Data communication networks serve User Equipment (UE) with user data services like internet access, media conferencing, user messaging, social networking, and the like. To extend the range and mobility of these user data services, the data communication networks deploy wireless access networks. The wireless access networks have wireless base stations that communicate wirelessly with the UEs over Radio Frequency (RF) links. Wireless relays are used to further extend the range of the wireless base stations. The wireless relays exchange user data between the UEs and the wireless base stations.

The typical wireless relay has a wireless access point to serve UEs. The wireless relay also has relay equipment to provide wireless connectivity to the wireless data network. The wireless access point transmits to the UEs over a transmit frequency band. The relay equipment receives from the wireless data network over a receive frequency band. In some deployments, the access point transmit band and the relay equipment receive band are only separated by a small guard band in the range of 15 Mega-Hertz (MHz).

Many wireless relays are mounted on poles or other structures that have restricted geometries. The geometric restrictions placed on the wireless relays may force the wireless access point and the relay equipment to be mounted very close together. This forced proximity of the wireless access point and the relay equipment causes the wireless access point transmit signals to unduly interfere and the relay equipment receive signals. Unfortunately, the RF interference between the wireless access point and the relay equipment in geometrically-challenged wireless relays hurts the relay user's wireless data service. The current technology to mitigate the RF interference in these geometrically-challenged wireless relays is not effective.

TECHNICAL OVERVIEW

A wireless relay mitigates Radio Frequency (RF) interference. A receive antenna receives RF signals over a receive frequency band. An RF receiver processes the received signals to detect and transfer RF interference levels. The processing circuitry transfers control data to a tunable RF isolator that indicates the size of a guard band between the receive frequency band and a transmit frequency band. The guard band size is selected based on the RF interference levels for the receive frequency band at the receive antenna. The tunable RF isolator attenuates RF frequencies in the tunable guard band from corresponding RF transmit signals. A transmit antenna transfers the RF transmit signals over the transmit frequency band.

DETAILED DESCRIPTION

Figure 1:
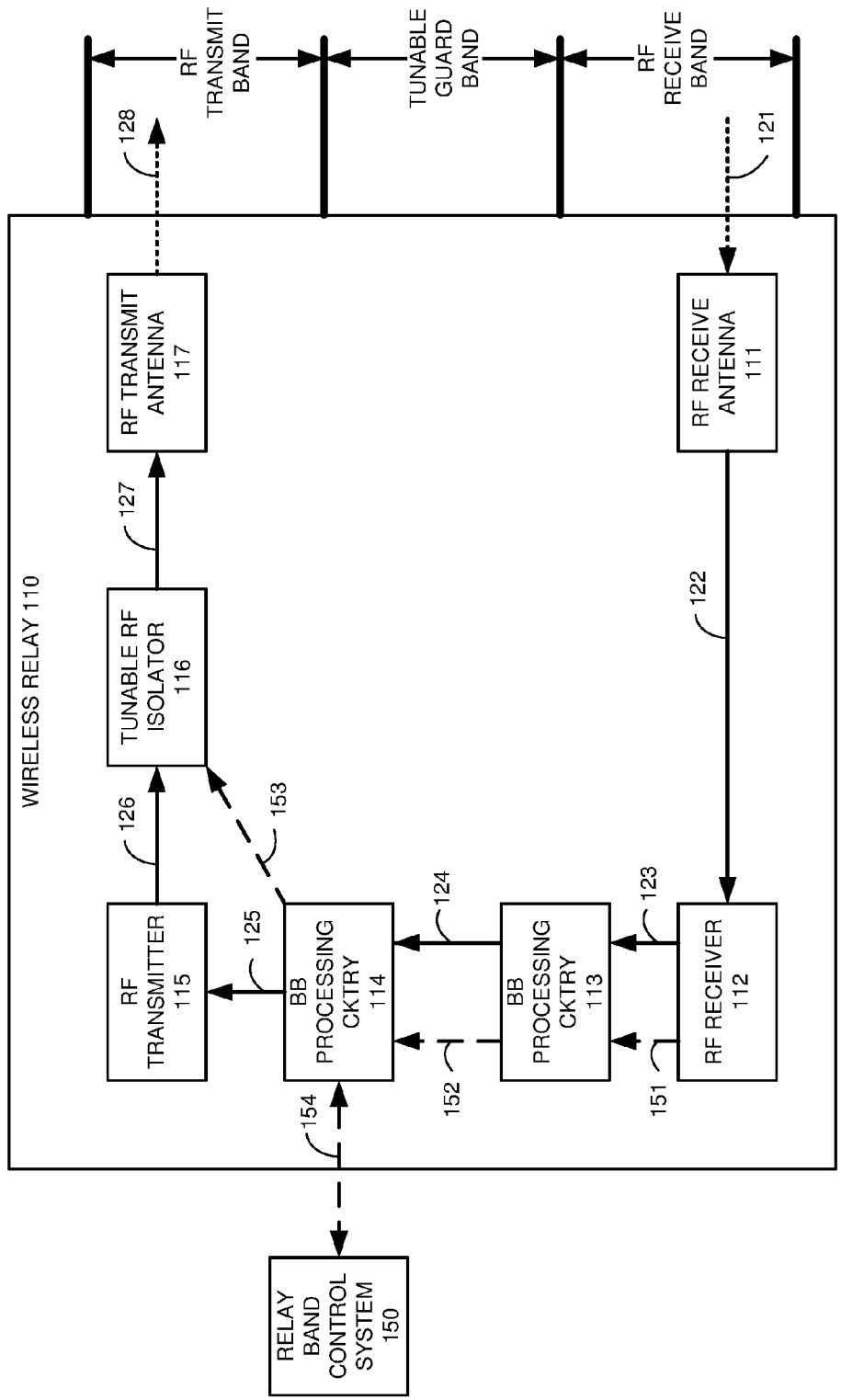
FIG. 1 illustrates a wireless relay to mitigate Radio Frequency (RF) interference.

FIG. 1 illustrates wireless relay 110 to mitigate Radio Frequency (RF) interference. Wireless relay 110 comprises: RF receive antenna 111, RF receiver 112, Baseband (BB) processing circuitry (CKTRY) 113-114, RF transmitter 115, tunable RF isolator 116, and RF transmit antenna 117. RF receive antenna 111 receives wireless RF receive signals 121 over an RF receive band. RF transmit antenna 117 transmits wireless RF transmit signals 128 over an RF transmit band. A tunable guard band is between the RF transmit band and the RF receive band. Wireless relay 110 dynamically controls the size of the tunable guard band. Relay band control system 150 may direct this dynamic guard band control or could be omitted.

RF receive antenna 111 comprises metal elements connected to a feed line coupling. The metal elements are sized and arranged for the RF receive band. RF transmit antenna 117 comprises metal elements connected to a feed line coupling, and these metal elements are sized and arranged for the RF transmit band. RF antennas 111 and 117 may comprise Giga-Hertz (GHz) band dipole antenna structures. Typically, RF receive antenna 111 also transmits, and RF transmit antenna 117 also receives.

RF receiver 112 comprises a Low-Noise Amplifier (LNA), demodulator, and signal processor. RF receiver 112 may be integrated within a GHz transceiver in a wireless access point or relay equipment. RF receiver 112 detects and reports RF interference in the RF receive band for RF receive antenna 111. The RF interference for RF receive antenna 111 is used to control the size of the tunable guard band. RF transmitter 115 may be integrated within a GHz transceiver in a wireless access point or relay equipment.

BB processing CKTRY 113-114 comprises Central Processing Units (CPUs), Random Access Memory (RAM), data storage, Input/Output (I/O) transceivers, and bus interfaces. The CPUs retrieve software from the memories and execute the software to direct the operation of other relay components. The software comprises modules for operating system, user access, network access, and network control. In some examples, BB processing CKTRY 113-114 comprise a Long-Term Evolution (LTE) evolved-node-B data processing system and an LTE User Equipment (UE) data processing system, although BB processing circuitry 113-114 could be integrated together. BB processing circuitry 113-114 may process the RF interference indication for RF receive antenna 111 to control the size of the tunable guard band.

Tunable RF isolator 116 comprises an RF circulator with a port on its transmit circuit that is terminated on a tunable filter. The tunable filter passes RF frequencies in the tunable guard band and below. The tunable filter rejects RF frequencies above the tunable guard band. Tunable RF isolator 116 sizes the guard band and sharpens the frequency shoulder of electric RF transmit signals 126 to form cleaner RF transmit signals 127. Cleaner RF transmit signals 127 drive RF transmit antenna 117 to emit cleaner wireless RF transmit signals 128. Cleaner wireless RF transmit signals 128 should not interfere with the RF receive band or wireless RF receive signals 121. The size of the guard band in tunable RF isolator 116 is controlled by control signals 153.

Relay band control system 150 comprises a computer system and software that may be integrated within the other network elements of a wireless data network. Relay band control system 150 processes interference data for RF receive antenna 111 to control the size of the tunable guard band over control signals 153-154. Alternatively, BB processing CKTRY 113 and/or CKTRY 114 may process interference data for RF receive antenna 111 to control the size of the guard band over control signals 152-153. In yet another alternative, RF receiver 112 may process interference data for RF receive antenna 111 to control the size of the guard band over control signals 151-153. Tunable RF isolator 116 may process the interference data for RF receive antenna 111 to control the size of the guard band.

In operation, RF receive antenna 111 receives wireless RF receive signals 121 over the RF receive band. Wireless RF receive signals 121 carry user data for transmission in wireless RF transmit signals 128. RF receive antenna 111 transfers corresponding electric RF receive signals 122 over the RF receive band to RF receiver 112. RF receiver 112 processes the corresponding electric RF receive signals to generate corresponding intermediate signals 123 that are transferred to BB processing CKTRY 113.

RF receiver 112 also processes corresponding electric RF receive signals 122 to detect RF interference levels at RF receive antenna 111. Wireless relay 110 will increase the tunable guard band responsive to increases in RF interference levels at RF receive antenna 111. Wireless relay 110 will decrease the guard band responsive to decreases in RF interference levels at RF receive antenna 111. For example, a default 30 MHz guard band could be increased to 50 MHz for high RF interference levels and could be decreased to 10 MHz for low RF interference levels.

Various guard band control techniques are available. RF receiver 112 may either process the RF interference levels to control the size of the guard band or transfer the RF interference levels to BB processing CKTRY 113. BB processing CKTRY 113 may process the RF interference levels to control the size of the guard band or transfer the RF interference levels to BB processing CKTRY 114 or relay band control system 150. BB processing CKTRY 114 may process the RF interference levels to control the size of the guard band or transfer the RF interference levels to relay band control system 150 or tunable RF isolator 116. Relay band control system 150 or tunable RF isolator 116 may also process the RF interference level to control the size of the guard band. BB processing CKTRY 114 typically transfers control signals 153 indicating the tunable guard band size to tunable RF isolator 116. Tunable RF isolator 116 responsively modifies its tunable filter to the specified guard band size.

BB processing CKTRY 113 receives intermediate signals 123 and transfers corresponding data signals 124 to BB processing CKTRY 114. BB processing CKTRY 114 receives data signals 124 and transfers corresponding intermediate signals 125 to RF transmitter 115. RF transmitter 115 transfers corresponding electric RF transmit signals 126 over the RF transmit band to tunable RF isolator 116. Tunable RF isolator 116 receives electric RF transmit signals 126 and attenuates RF frequencies in the tunable guard band and below from electric RF transmit signals 126. Tunable RF isolator 116 transfers attenuated electric RF transmit signals 127 over the transmit frequency band to RF transmit antenna 117. Attenuated electric RF transmit signals 127 drive RF transmit antenna 117 to transfer corresponding attenuated wireless RF transmit signals 128 over the RF transmit band. Attenuated wireless RF transmit signals 128 carry user data, but RF transmit signals 128 should not interfere with wireless RF receive signals 121 at RF receive antenna 111.

Figure 2:
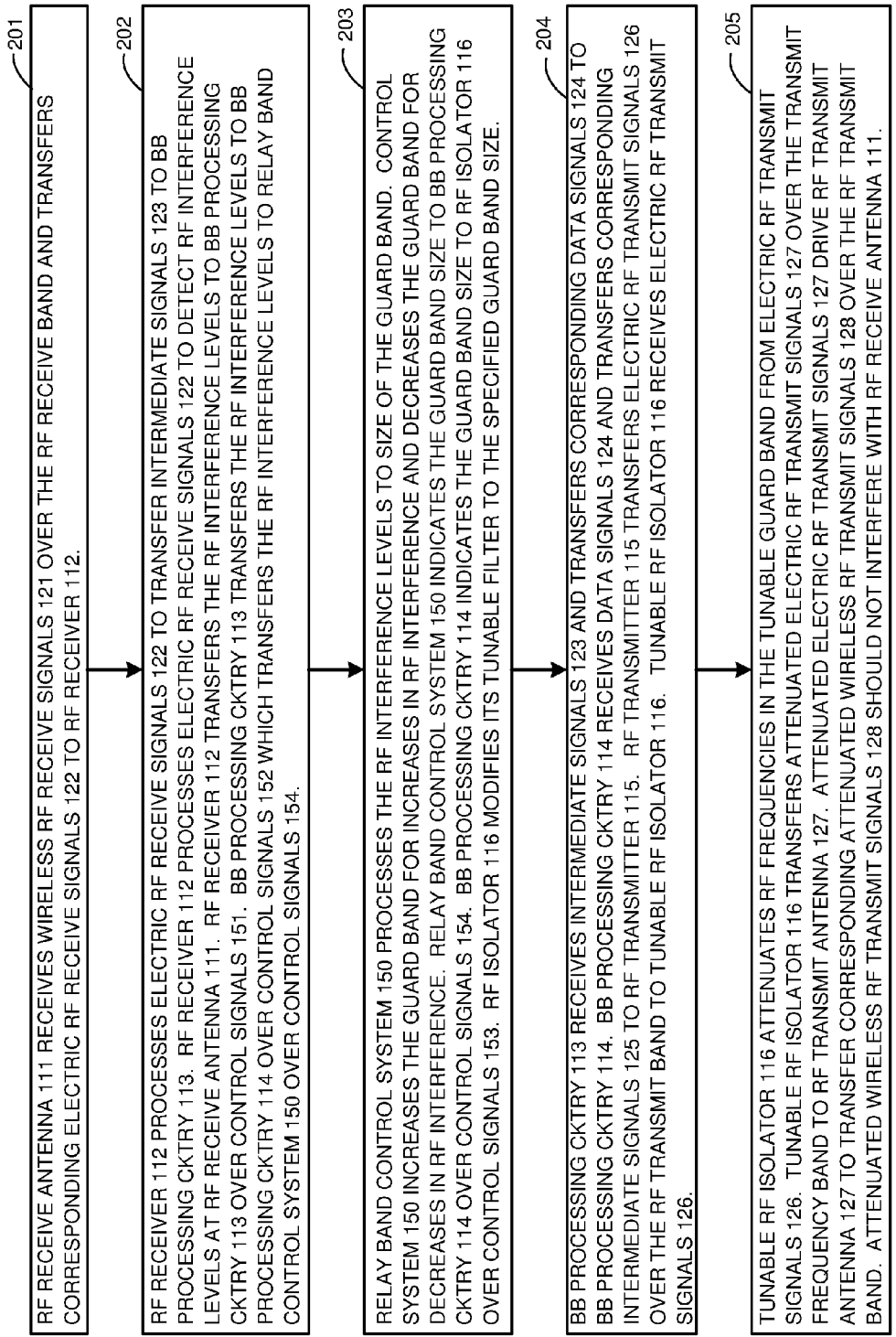
FIG. 2 illustrates the operation of the wireless relay to mitigate RF interference.

FIG. 2 illustrates the operation of wireless relay 110 to mitigate RF interference. RF receive antenna 111 receives wireless RF receive signals 121 over the RF receive band and transfers corresponding electric RF receive signals 122 to RF receiver 112 (201). RF receiver 112 processes corresponding electric RF receive signals 122 to transfer intermediate signals 123 to BB processing CKTRY 113 (202). RF receiver 112 also processes corresponding electric RF receive signals 122 to detect RF interference levels at RF receive antenna 111. RF receiver 112 transfers the RF interference levels to BB processing CKTRY 113 over control signals 151. BB processing CKTRY 113 transfers the RF interference levels to BB processing CKTRY 114 over control signals 152. BB processing CKTRY 114 transfers the RF interference levels to relay band control system 150 over control signals 154.

Relay band control system 150 processes the RF interference levels to size the guard band (203). Relay band control system 150 increases the guard band for increases in RF interference and decreases the guard band for decreases in RF interference. Relay band control system 150 indicates the size of the guard band to BB processing CKTRY 114 over control signals 154. BB processing CKTRY 114 indicates the guard band size to tunable RF isolator 116 over control signals 153. Tunable RF isolator 116 modifies its tunable filter to the specified guard band size.

BB processing CKTRY 113 receives intermediate signals 123 and transfers corresponding data signals 124 to BB processing CKTRY 114 (204). BB processing CKTRY 114 receives data signals 124 and transfers corresponding intermediate signals 125 to RF transmitter 115. RF transmitter 115 transfers electric RF transmit signals 126 over the RF transmit band to tunable RF isolator 116. Tunable RF isolator 116 receives electric RF transmit signals 126.

Tunable RF isolator 116 attenuates RF frequencies in the tunable guard band from electric RF transmit signals 126 (205). Tunable RF isolator 116 transfers attenuated electric RF transmit signals 127 over the transmit frequency band to RF transmit antenna 117. Attenuated electric RF transmit signals 127 drive RF transmit antenna 117 to transfer corresponding attenuated wireless RF transmit signals 128 over the RF transmit band. Attenuated wireless RF transmit signals 128 should not interfere with wireless RF receive signals 121 in the RF receive band at RF receive antenna 111.

Figure 3:
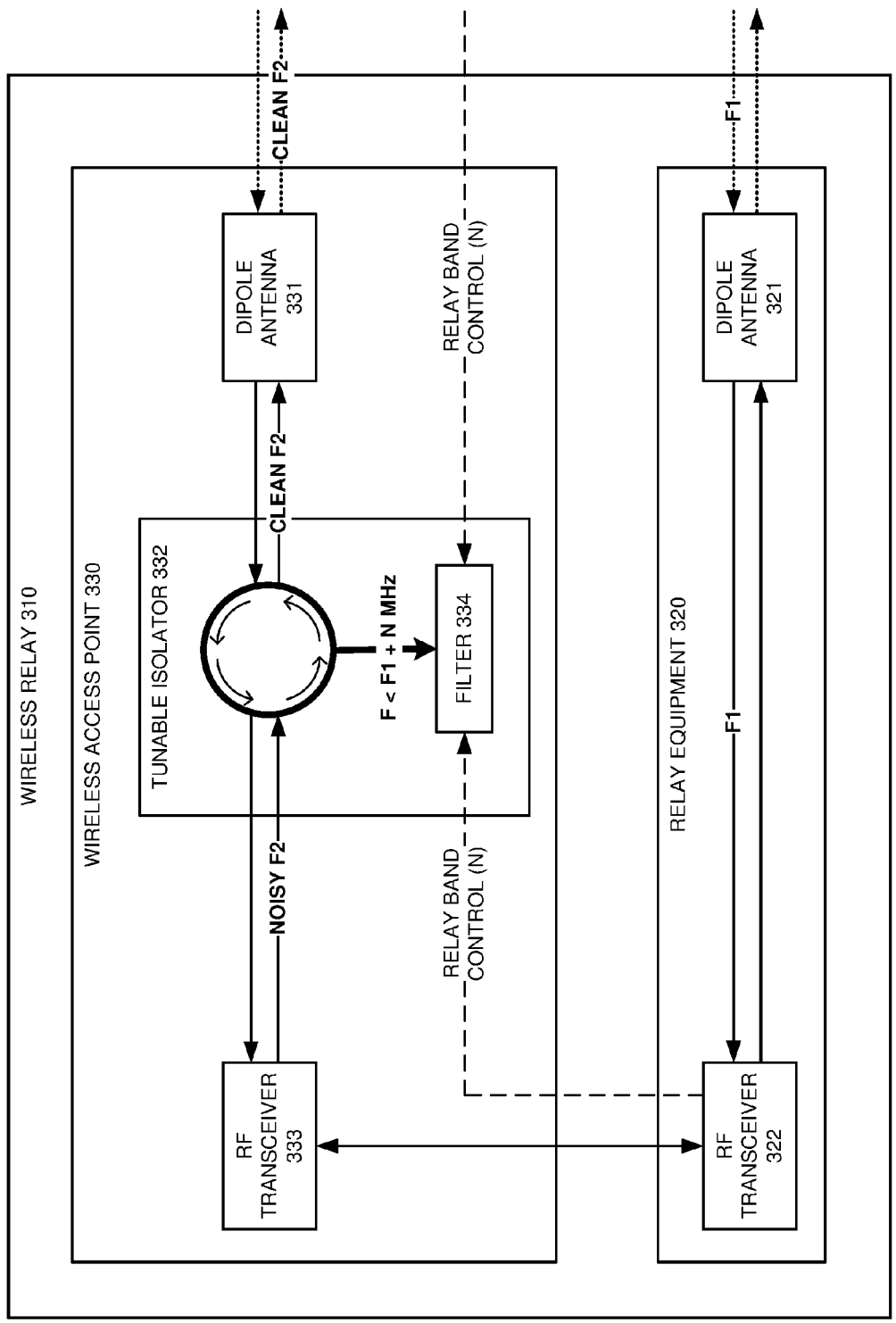
FIG. 3 illustrates a wireless relay with a wireless access point that mitigates RF interference at its relay equipment.

FIG. 3 illustrates wireless relay 310 with wireless access point 330 that mitigates RF interference at relay equipment 320. Relay equipment 320 comprises dipole antenna 321 and RF transceiver 322. RF transceiver 322 comprises amplifiers, modulators, filters, signal processors, and a computer system. The computer system comprises CPUs, Random RAM, data storage, I/O transceivers, and bus interfaces. The CPUs retrieve software from the memories and execute the software to direct the operation of the other components. The software comprises modules for operating system, access point interface, network access, and network control. Relay equipment 320 may comprise User Equipment (UE) that has been adapted to serve wireless access points in a wireless relay. Exemplary wireless protocols for relay equipment 320 include LTE and Institute of Electrical and Electronic Engineering (IEEE) 802.11, although other protocols could be used.

Wireless access point 330 comprises dipole antenna 331, tunable RF isolator 332, and RF transceiver 333. Tunable RF isolator 332 comprises tunable band-pass filter 334. RF transceiver 333 comprises amplifiers, modulators, filters, signal processors, and a computer system. The computer system comprises CPUs, Random RAM, data storage, I/O transceivers, and bus interfaces. The CPUs retrieve software from the memories and execute the software to direct the operation of the other components. The software comprises modules for operating system, user device interface, relay equipment access, and network control. Wireless access point 330 may comprise an LTE evolved node B, IEEE 802.11 hot spot, or some other type of wireless base station.

Dipole antenna 321 receives wireless RF receive signals over a first RF band (F1). F1 could be a 100 MHz band in the GHz range. Dipole antenna 321 transfers corresponding electric RF receive signals to RF transceiver 322 over F1. RF transceiver 322 processes the electric RF receive signals to generate corresponding intermediate signals that are transferred to RF transceiver 333. RF transceiver 322 also processes the electric RF receive signals from dipole antenna 321 to detect RF interference levels for F1. Wireless relay 310 will increase the guard band responsive to increases in RF interference levels for F1 at dipole antenna 321. Wireless relay 310 will decrease the guard band responsive to decreases in RF interference levels for F1 at dipole antenna 321.

Various guard band control techniques are available and are represented on FIG. 3 by dashed lines that are labeled "RELAY BAND CONTROL (N)." RF transceiver 322 may process the RF interference levels to control the guard band size (N) or transfer the RF interference levels to RF transceiver 333 or a remote controller. RF transceiver 333 may process the RF interference levels to control the guard band size (N) or transfer the RF interference levels to a remote controller. The guard band control tasks could be distributed among RF transceiver 322, RF transceiver 333, and the remote controller. RF transceiver 333 transfers control signals indicating the guard band size (N) to tunable RF isolator 332. Tunable RF isolator 332 responsively modifies tunable band-pass filter 334 to cut-off RF energy below the frequency (F1+N).

RF transceiver 333 receives intermediate signals from RF transceiver 322 and transfers noisy electric RF transmit signals to tunable RF isolator 332 over a second frequency band (NOISY F2). F2 could be a 100 MHz band that is adjacent to F1 in the GHz range. Tunable RF isolator 332 circulates the noisy electric RF transmit signals to band-pass filter 334. Band-pass filter 334 sinks RF energy below the frequency (F1+N) and rejects RF energy above the frequency (F1+N). Tunable isolator 332 transfers clean electric RF transmit signals to dipole antenna 331 over F2 (CLEAN F2). The clean electric RF transmit signals drive dipole antenna 331 to emit clean wireless RF transmit signals over F2 (CLEAN F2). The clean F2 signals transmitted by wireless access point 330 should not interfere with the F1 signals received by relay equipment 320.

Dipole antenna 331 also receives wireless RF receive signals over another RF band and transfers corresponding electric RF receive signals to tunable isolator 332. Tunable isolator 332 circulates the electric RF receive signals to RF transceiver 333. RF transceiver 333 processes the electric RF receive signals to generate the corresponding intermediate signals. RF transceiver 333 transfers the intermediate signals to RF transceiver 322. RF transceiver 322 receives the intermediate signals from RF transceiver 333. RF transceiver 322 processes the intermediate signals to generate electric RF transmit signals at another RF band. The electric RF transmit signals drive dipole antenna 321 to emit wireless RF transmit signals over the other RF band.

Figure 4:
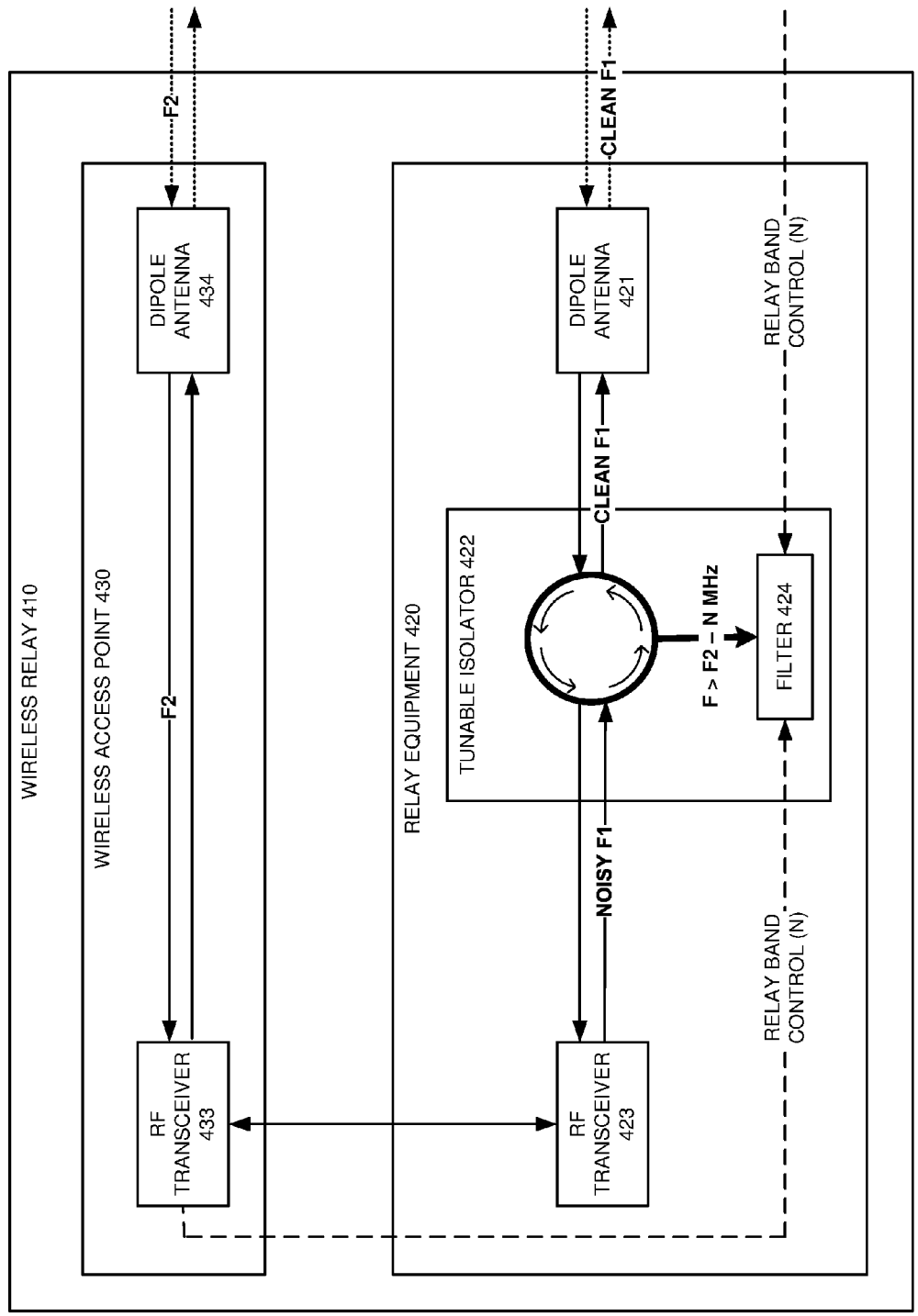
FIG. 4 illustrates a wireless relay with relay equipment that mitigates RF interference at its wireless access point.

FIG. 4 illustrates wireless relay 410 with relay equipment 420 that mitigates RF interference at wireless access point 430. Relay equipment 420 comprises dipole antenna 421, tunable RF isolator 422, and RF transceiver 423. Tunable RF isolator 422 comprises tunable band-pass filter 424. RF transceiver 423 comprises amplifiers, modulators, filters, signal processors, and a computer system. The computer system comprises CPUs, Random RAM, data storage, I/O transceivers, and bus interfaces. The CPUs retrieve software from the memories and execute the software to direct the operation of the other components. The software comprises modules for operating system, access point interface, network access, and network control. Relay equipment 420 may comprise a UE that has been adapted to serve wireless access points in a wireless relay. Exemplary wireless protocols for relay equipment 420 include LTE and IEEE 802.11, although other protocols could be used.

Wireless access point 430 comprises RF transceiver 433 and dipole antenna 434. RF transceiver 433 comprises amplifiers, modulators, filters, signal processors, and a computer system. The computer system comprises CPUs, Random RAM, data storage, I/O transceivers, and bus interfaces. The CPUs retrieve software from the memories and execute the software to direct the operation of the other components. The software comprises modules for operating system, user device interface, relay equipment access, and network control. Wireless access point 430 may comprise an LTE evolved node B, IEEE 802.11 hot spot, or some other type of wireless base station.

Dipole antenna 434 receives wireless RF receive signals over a second RF band (F2). F2 could be a 100 MHz band in the GHz range. Dipole antenna 434 transfers corresponding electric RF receive signals to RF transceiver 433 over F2. RF transceiver 433 processes the electric RF receive signals to generate corresponding intermediate signals that are transferred to RF transceiver 423. RF transceiver 433 also processes the electric RF receive signals from dipole antenna 434 to detect RF interference levels for F2. Wireless relay 410 will increase the guard band responsive to increases in RF interference levels for F2 at dipole antenna 434. Wireless relay 410 will decrease the guard band responsive to decreases in RF interference levels for F2 at dipole antenna 434.

Various guard band control techniques are available and are represented on FIG. 4 by dashed lines that are labeled "RELAY BAND CONTROL (N)." RF transceiver 433 may process the RF interference levels to control the guard band size (N) or transfer the RF interference levels to RF transceiver 423 or a remote controller. RF transceiver 423 may process the RF interference levels to control the guard band size (N) or transfer the RF interference levels to a remote controller. The guard band control tasks could be distributed among RF transceiver 423, RF transceiver 433, and the remote controller. RF transceiver 423 transfers control signals indicating the guard band size (N) to tunable RF isolator 422. Tunable RF isolator 422 responsively modifies tunable band-pass filter 424 to cut-off RF energy above the frequency (F2−N).

RF transceiver 423 receives intermediate signals from RF transceiver 433 and transfers noisy electric RF transmit signals to tunable RF isolator 422 over a first frequency band (NOISY F1). F1 could be a 100 MHz band that is adjacent to F2 in the GHz range. Tunable RF isolator 422 circulates the noisy electric RF transmit signals to band-pass filter 424. Band-pass filter 424 sinks RF energy above the frequency (F2–N) and rejects RF energy above the frequency (F2–N). Tunable isolator 332 transfers clean electric RF transmit signals to dipole antenna 421 over F1 (CLEAN F1). The clean electric RF transmit signals drive dipole antenna 421 to emit clean wireless RF transmit signals over F1 (CLEAN F1). The clean F1 signals transmitted by relay equipment 420 should not interfere with the F2 signals received by wireless access point 430.

Dipole antenna 421 also receives wireless RF receive signals over another RF band and transfers corresponding electric RF receive signals to tunable isolator 422. Tunable isolator 422 circulates the electric RF receive signals to RF transceiver 423. RF transceiver 423 processes the electric RF receive signals to generate the corresponding intermediate signals. RF transceiver 423 transfers the intermediate signals to RF transceiver 433. RF transceiver 433 receives the intermediate signals from RF transceiver 423. RF transceiver 433 processes the intermediate signals to generate electric RF transmit signals at another RF band. The electric RF transmit signals drive dipole antenna 434 to emit wireless RF transmit signals over the other RF band.

Wireless relays 310 and 410 could be integrated together so the wireless relay receivers have RF protection for both the uplink and the downlink. The relay equipment could have overall control over the size of the guard band with the wireless access point requesting sizing changes. The wireless access point could have overall control with the relay equipment requesting sizing changes. The largest or smallest guard band size that is requested by the wireless access point or relay equipment could be used. The average guard band size that is requested by the wireless access point and the relay equipment could be used.

Figure 5:
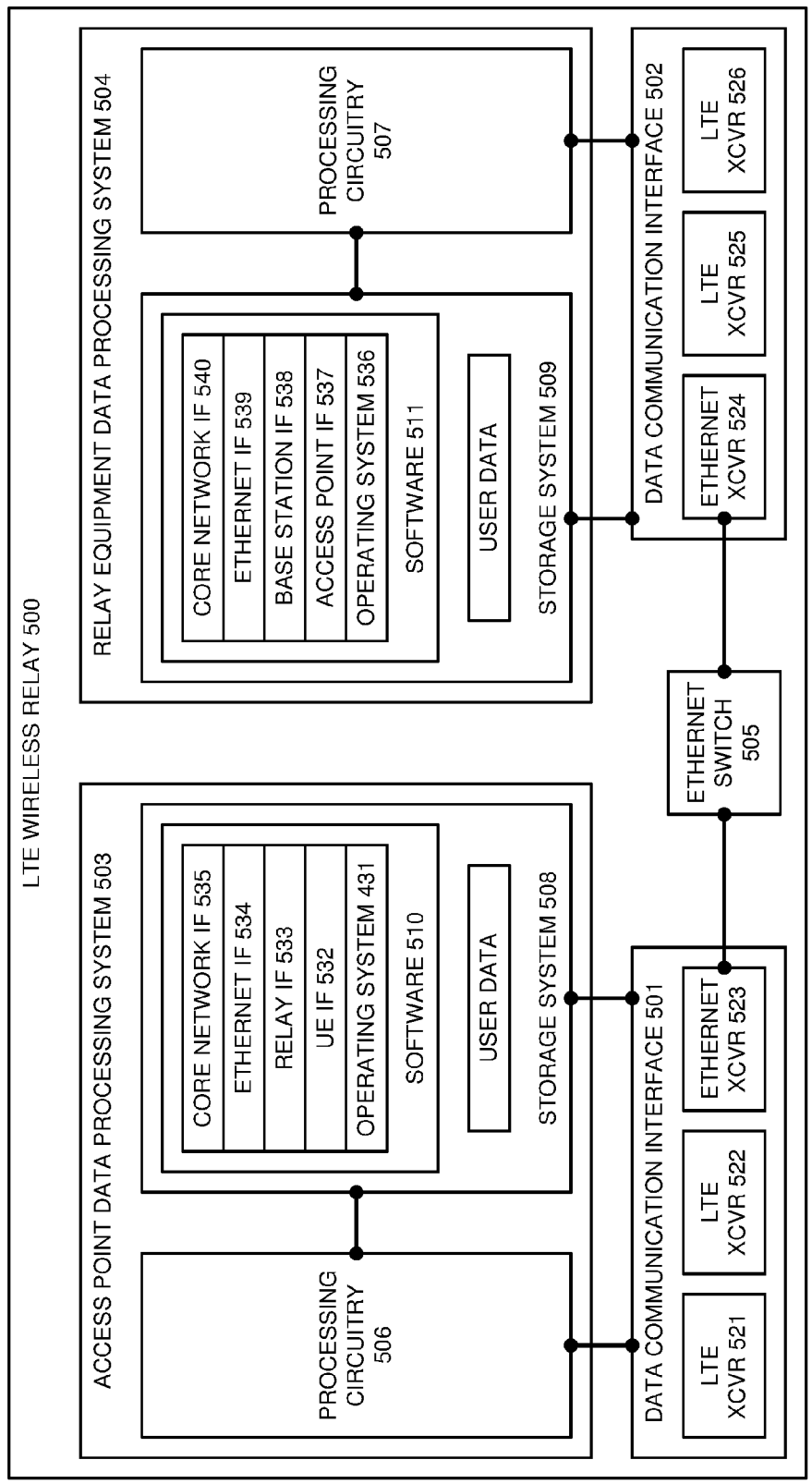
FIG. 5 illustrates a Long-Term Evolution (LTE) wireless relay to mitigate RF interference between its wireless access point and its relay equipment.

FIG. 5 illustrates Long-Term Evolution (LTE) wireless relay 500 to mitigate RF interference between wireless access point transceivers 521-522 and relay equipment transceivers 525-526. LTE wireless relay 500 comprises data communication interfaces 501-502, data processing systems 503-504, and IEEE 802.3 (Ethernet) switch 505. Data communication interface 501 comprises LTE transceivers (XCVRs) 521-522 and Ethernet transceiver 523. Data communication interface 502 comprises Ethernet transceiver 524 and LTE transceivers 525-526. Transceivers 521-526 comprise communication components, such as signal processors, ports, bus interfaces, memory, software, and the like. Access point data processing system 503 and relay equipment data processing system 504 communicate over Ethernet transceivers 523-524 and Ethernet switch 505. LTE transceivers 521-522 and 525-526 include tunable RF isolators and RF interference detection circuitry.

Access point data processing system 503 comprises processing circuitry 506 and storage system 508. Storage system 508 stores software 510 and user data. Software 510 includes respective software modules 531-535. Storage system 508 comprises non-transitory, machine-readable, data storage media, such as flash drives, memory circuitry, and the like. Software 510 comprises machine-readable instructions that control the operation of processing circuitry 506 when executed. Processing circuitry 506 comprises CPUs and RAM.

Relay equipment data processing system 504 comprises processing circuitry 507 and storage system 509. Storage system 509 stores software 511 and user data. Software 511 includes respective software modules 536-540. Processing circuitry 507 comprises CPUs and RAM. Storage system 509 comprises non-transitory, machine-readable, data storage media, such as flash drives, memory circuitry, and the like. Software 511 comprises machine-readable instructions that control the operation of processing circuitry 507 when executed.

When executed by processing circuitry 506, software modules 531-535 direct processing circuitry 506 to perform the following operations. Operating system 531 interfaces between software modules 532-535 and system software/hardware. UE interface (IF) 532 directs user device access operations. Relay interface 533 controls relay equipment interactions over ethernet interface 534 including guard band sizing operations. Core network interface 535 interacts with core network systems over signaling links like S1-MME and X2—including guard band sizing operations.

When executed by processing circuitry 507, software modules 536-540 direct circuitry 507 to perform the following operations. Operating system 536 interfaces between software modules 537-540 and system software/hardware. Access point interface 537 interacts with relay interface 533 over Ethernet interface 539 including guard band sizing operations. Core network interface 540 interacts with core network systems over signaling links like Non-Access Stratum (NAS)—including guard band sizing operations.

Figure 6:
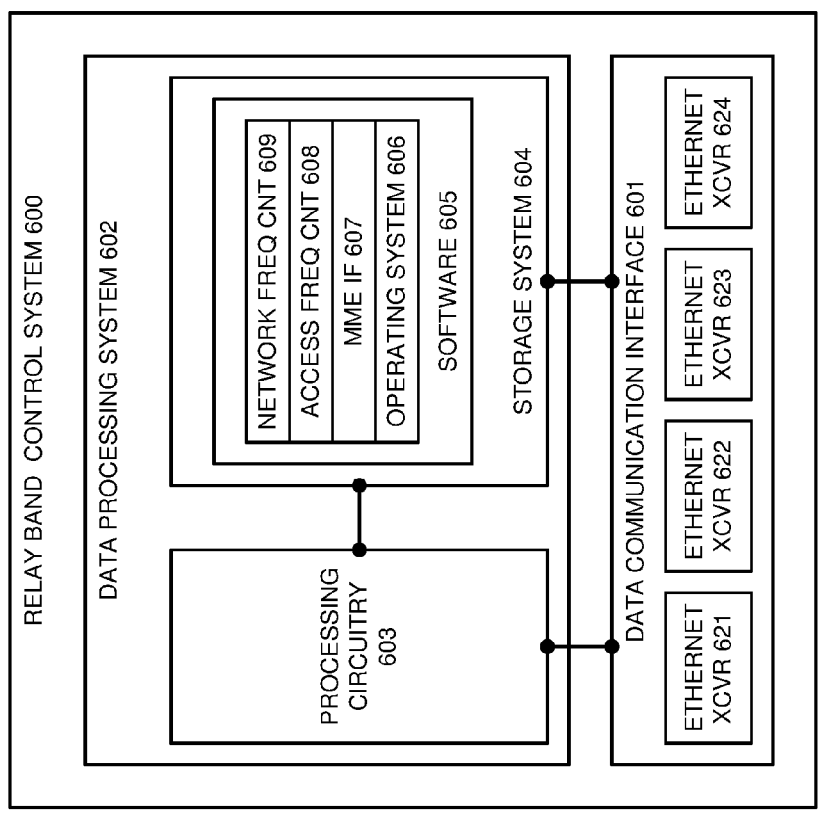
FIG. 6 illustrates a relay band control system to mitigate RF interference in wireless relays.

FIG. 6 illustrates relay band control system 600 to mitigate RF interference at wireless relays. Relay band control system 600 comprises data communication interface 601 and data processing system 602. Data communication interface 601 comprises transceivers 621-624 for Ethernet/Internet Protocol (IP) communications. Transceivers 621-624 comprise communication components, such as signal processors, ports, bus interfaces, memory, software, and the like.

Data processing system 602 comprises processing circuitry 603 and storage system 604. Storage system 604 stores software 605. Software 605 includes respective software modules 606-609. Processing circuitry 603 comprises CPUs and RAM. Storage system 604 comprises non-transitory, machine-readable, data storage media, such as flash drives, memory circuitry, and the like. Software 605 comprises machine-readable instructions that control the operation of processing circuitry 603 when executed.

When executed by processing circuitry 603, software modules 606-609 direct circuitry 603 to perform the following operations. Operating system 606 interfaces between software modules 607-609 and system software/hardware. MME interface 607 communicates with MMEs to receive RF interference levels at wireless relays and to transfer relay guard band sizes to wireless relays. Access frequency controller (FREQ CNT) 608 interacts with wireless access points in wireless relays over MME interface 607 to translate relay interference levels into guard band sizes. Network frequency controller 609 interacts with relay equipment in wireless relays over MME interface 607 to translate relay interference levels into guard band sizes.

Figure 7:
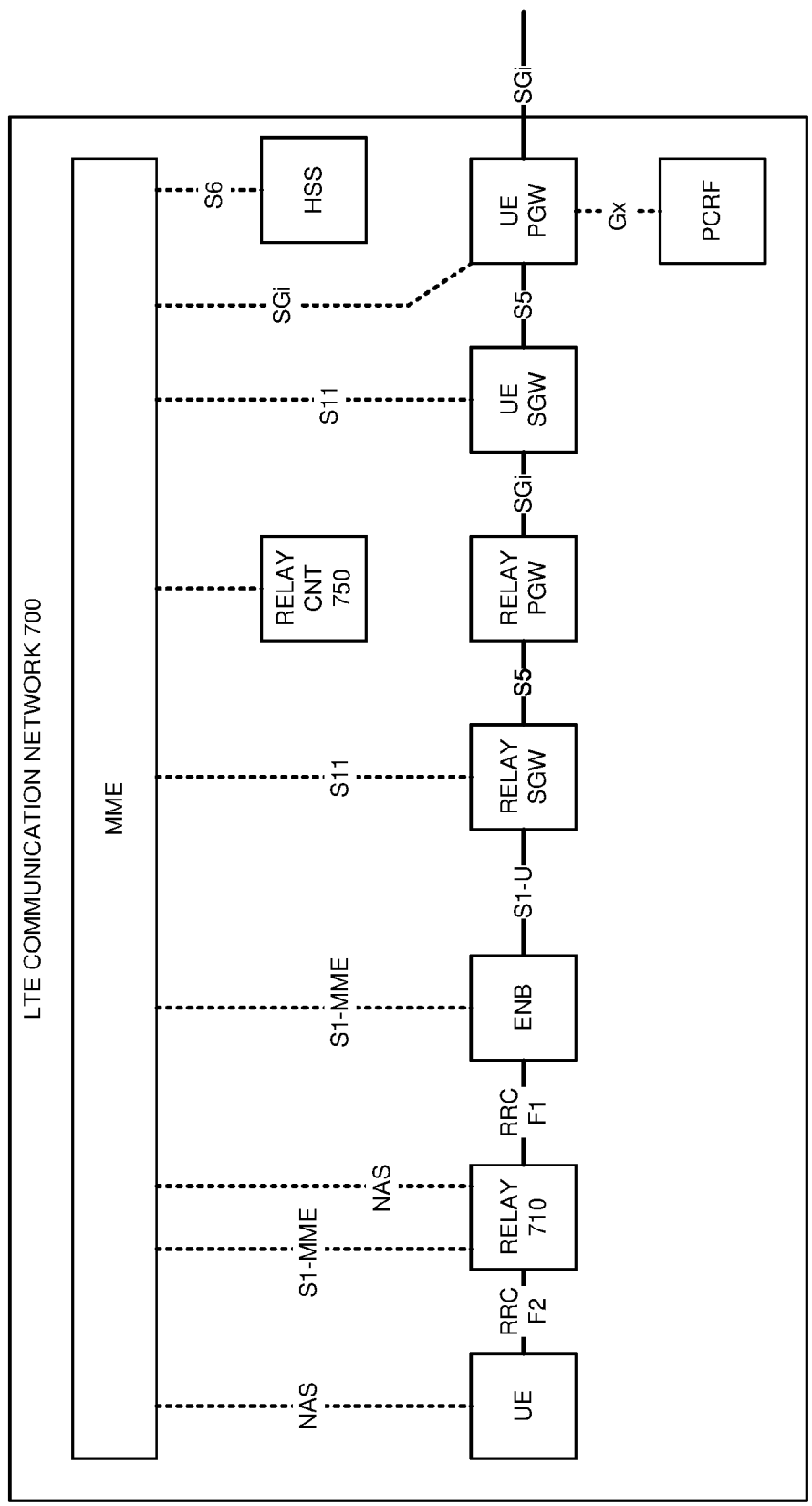
FIG. 7 illustrates a Long-Term Evolution (LTE) communication network to mitigate RF interference at wireless relays.

FIG. 7 illustrates Long-Term Evolution (LTE) communication network 700 to mitigate RF interference at wireless relays. LTE communication network 700 comprises: a UE, wireless relay 710, eNode-B (ENB), relay Serving Gateway (SGW), relay Packet Data Network Gateway (PGW), UE SGW, UE PGW, Policy Charging and Rules Function (PCRF), Mobility Management Entity (MME), Home Subscriber System (HSS), and Relay band control server 750. The ENB and wireless relay 710 communicate over LTE Radio Resource Control (RRC) links in a first frequency channel (F1). The UE and wireless relay 710 communicate over LTE RRC links in a second frequency channel (F2). F1 and F2 are adjacent MHz channels in a GHz band.

The ENB and the relay SGW communicate over S1-U links. The relay SGW and relay PGW communicate over S5 links. The relay PGW and UE SGW communicate over SGi links. The UE SGW and UE PGW communicate over S5 links. The UE PGW communicates with the PCRF over Gx links. The UE PGW communicates with other systems including the MME over SGi links. The MME has the following signaling links: Non-Access Stratum (NAS) to the UE, S1-MME to wireless relay 710 for its wireless access point, NAS to wireless relay 710 for its relay equipment, S1-MME to the ENB, S11 to the relay SGW and the UE SGW, and S6 to the HSS. Note that the UE NAS, relay S1-MME, and relay NAS traverse the S1-U, S5, and SGi data links to reach the MME.

In operation, wireless relay 710 wirelessly attaches to the ENB. Wireless relay 710 then exchanges network signaling (S1-MME and NAS) with the ENB and the MME to obtain wireless relay data services. The relay data services comprise relay data backhaul and relay signaling backhaul. The UE then attaches to wireless relay 710 to obtain user data services like internet access, media conferencing, user messaging, social networking, and the like.

Wireless relay 710 exchanges user data and network signaling with the UE to deliver the user data services. Using its relay data services, wireless relay 710 exchanges user data and network signaling with the ENB to deliver the user data services. The ENB exchanges user data and network signaling with the relay SGW to deliver the user data services. The relay SGW exchanges user data and signaling for the user data services with the relay P-GW. The relay PGW exchanges user data and signaling for the user data services with the UE SGW. The UE SGW exchanges user data and signaling for the user data services with the UE P-GW. The UE PGW exchanges the signaling for the user data services with the MME. The UE PGW exchanges user data for the user data services with external systems (not shown).

During the delivery of the user data services, wireless relay 710 receives wireless RF receive signals from the ENB over the RRC F1 link. The RF receive signals from the ENB carry user data for the UE. Wireless relay 710 transfers the user data to the UE in wireless RF transmit signals over the RRC F2 link. Wireless relay 710 detects RF interference levels on the RRC F1 link.

Wireless relay 710 transfers the RRC F1 interference levels to relay band control server 750 over its NAS link or S1-MME link to the MME. Relay band control server 750 processes the RRC F1 interference levels to control the size of the guard band between F1 and F2 at wireless relay 710. Relay band control server 750 transfers the guard band sizes to wireless relay 710 through the MME and its NAS link or S1-MME link. Wireless relay 710 responsively sets its tunable RF isolators to the size of the guard bands. Wireless relay 710 then filters RRC F2 transmissions using the tunable guard band to protect RRC F1 reception.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. Thus, the invention is not limited to the specific embodiments described above, but only by the following claims and their equivalents.

What is claimed is:

1. A method of operating a wireless relay to mitigate Radio Frequency (RF) interference, the method comprising:
   a receive antenna receiving wireless RF receive signals over a receive frequency band and transferring corresponding electric RF receive signals over the receive frequency band to an RF receiver;
   the RF receiver processing the corresponding electric RF receive signals to detect the RF interference and responsively transferring RF interference levels to processing circuitry;
   the processing circuitry receiving the RF interference levels and transferring control data to a tunable RF isolator that indicates a size of a tunable guard band between a transmit frequency band and the receive frequency band that was selected based on the RF interference levels;
   an RF transmitter transferring electric RF transmit signals over the transmit frequency band to the tunable RF isolator;
   the tunable RF isolator receiving the tunable guard band indication and receiving the electric RF transmit signals, and in response, attenuating RF frequencies in the tunable guard band from the electric RF transmit signals and transferring the attenuated electric RF transmit signals over the transmit frequency band to a transmit antenna; and
   the transmit antenna receiving the attenuated electric RF transmit signals and transferring corresponding attenuated wireless RF transmit signals over the transmit frequency band.

2. The method of claim 1 wherein the receive antenna receiving the wireless RF receive signals over the receive frequency band comprises relay equipment receiving the wireless RF receive signals from a wireless data network over the receive frequency band.

3. The method of claim 2 wherein the transmit antenna transferring the corresponding attenuated wireless RF transmit signals over the transmit frequency band comprises a wireless access point transmitting the corresponding attenuated wireless RF transmit signals to wireless user devices over the transmit frequency band.

4. The method of claim 1 wherein the receive antenna receiving the wireless RF receive signals over the receive frequency band comprises a wireless access point receiving the wireless RF receive signals from wireless user devices over the receive frequency band.

5. The method of claim 4 wherein the transmit antenna transferring the corresponding attenuated wireless RF transmit signals over the transmit frequency band comprises relay equipment transmitting the corresponding attenuated wireless RF transmit signals to a wireless data network over the transmit frequency band.

6. The method of claim 1 wherein the tunable RF isolator comprises a tunable RF circulator.

7. The method of claim 1 wherein the receive antenna and the transmit antenna comprise dipole antennas.

8. The method of claim 1 wherein the size of the guard band is increased when the RF interference levels increase and the size of the guard band is decreased when the RF interference levels decrease.

9. The method of claim 1 further comprising the processing circuitry transferring the RF interference levels and receiving the size of the tunable guard band over Long Term Evolution (LTE) S1-MME signaling with a wireless data network.

10. The method of claim 1 further comprising the processing circuitry transferring the RF interference levels and receiving the size of the tunable guard band over Long Term Evolution (LTE) Non-Access Stratum (NAS) signaling with a wireless data network.

11. A wireless relay to mitigate Radio Frequency (RF) interference comprising:
- a receive antenna configured to receive wireless RF receive signals over a receive frequency band and transfer corresponding electric RF receive signals over the receive frequency band to an RF receiver;
- the RF receiver configured to process the corresponding electric RF receive signals to detect the RF interference and responsively transfer RF interference levels to processing circuitry;
- the processing circuitry configured to receive the RF interference levels and transfer control data to a tunable RF isolator that indicates a size of a tunable guard band between a transmit frequency band and the receive frequency band, wherein the tunable guard band was selected based on the RF interference levels;
- an RF transmitter configured to transfer electric RF transmit signals over the transmit frequency band to the tunable RF isolator;
- the tunable RF isolator configured to receive the tunable guard band size indication and receive the electric RF transmit signals, and in response, attenuate RF frequencies in the tunable guard band from the electric RF transmit signals and transfer the attenuated electric RF transmit signals over the transmit frequency band to a transmit antenna; and
- the transmit antenna configured to receive the attenuated electric RF transmit signals and transfer corresponding attenuated wireless RF transmit signals over the transmit frequency band.

12. The wireless relay of claim 11 wherein the receive antenna is in relay equipment in the wireless relay.

13. The wireless relay of claim 12 wherein the transmit antenna is in a wireless access point in the wireless relay.

14. The wireless relay of claim 11 wherein the receive antenna is in a wireless access point in the wireless relay.

15. The wireless relay of claim 14 wherein the transmit antenna is in relay equipment in the wireless relay.

16. The wireless relay of claim 11 wherein the tunable RF isolator comprises a tunable RF circulator.

17. The wireless relay of claim 11 wherein the receive antenna and the transmit antenna comprise dipole antennas.

18. The wireless relay of claim 11 wherein the wireless relay is configured to increase the size of the guard band when the RF interference levels increase and to decrease the size of the guard band when the RF interference levels decrease.

19. The wireless relay of claim 11 wherein the processing circuitry is configured to transfer the RF interference levels and receive the size of the tunable guard band over Long Term Evolution (LTE) S1-MME signaling with a wireless data network.

20. The wireless relay of claim 11 wherein the processing circuitry is configured to transfer the RF interference levels and receive the size of the tunable guard band over Long Term Evolution (LTE) Non-Access Stratum (NAS) signaling with a wireless data network.

* * * * *